United States Patent
Litwinowicz

(10) Patent No.: US 8,712,607 B2
(45) Date of Patent: Apr. 29, 2014

(54) SYSTEMS AND METHODS FOR VELOCITY PROFILE BASED APPROACH TO POINT CONTROL

(75) Inventor: Anthony Litwinowicz, Derby, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 631 days.

(21) Appl. No.: 12/917,091

(22) Filed: Nov. 1, 2010

(65) Prior Publication Data
US 2011/0137494 A1  Jun. 9, 2011

Related U.S. Application Data

(60) Provisional application No. 61/267,120, filed on Dec. 7, 2009.

(51) Int. Cl.
| | |
|---|---|
| G05D 1/00 | (2006.01) |
| G05D 1/08 | (2006.01) |
| G05D 3/00 | (2006.01) |
| G06F 7/00 | (2006.01) |
| G06F 17/00 | (2006.01) |

(52) U.S. Cl.
USPC ............... 701/7; 701/1; 701/3; 701/5; 701/8; 701/9; 701/11

(58) Field of Classification Search
USPC ......................... 701/1, 3–11, 14–18
See application file for complete search history.

(56) References Cited

U.S. PATENT DOCUMENTS

| | | | |
|---|---|---|---|
| 3,199,811 A | | 8/1965 | Darby et al. |
| 3,927,306 A | * | 12/1975 | Miller ............................. 701/15 |
| 3,994,455 A | | 11/1976 | Simpson |
| 4,021,009 A | * | 5/1977 | Baker et al. .................... 244/180 |
| 4,029,271 A | * | 6/1977 | Murphy et al. ............. 244/17.13 |
| 4,319,219 A | | 3/1982 | Rein-Weston |
| 4,385,355 A | | 5/1983 | Verzella et al. |
| 4,417,308 A | | 11/1983 | Wright et al. |
| 4,551,804 A | * | 11/1985 | Clark et al. ........................ 701/3 |
| 4,564,908 A | | 1/1986 | Clelford et al. |
| 4,740,899 A | * | 4/1988 | McElreath ........................ 701/3 |
| 4,801,110 A | * | 1/1989 | Skutecki .................... 244/17.13 |
| 4,924,401 A | * | 5/1990 | Bice et al. ......................... 701/6 |
| 4,953,098 A | | 8/1990 | Fischer, Jr. et al. |
| 5,001,646 A | * | 3/1991 | Caldwell et al. .................. 701/7 |
| 5,034,896 A | | 7/1991 | Orgun et al. |
| 5,078,345 A | | 1/1992 | De Vries et al. |
| 5,195,039 A | * | 3/1993 | Gold et al. ........................ 701/7 |
| 5,465,212 A | * | 11/1995 | Fowler et al. .................... 701/15 |
| 6,062,513 A | * | 5/2000 | Lambregts ..................... 244/175 |
| 6,064,939 A | | 5/2000 | Nishida et al. |
| 6,101,431 A | * | 8/2000 | Niwa et al. ..................... 701/14 |
| 6,145,428 A | * | 11/2000 | Gold et al. .................... 89/41.21 |
| 6,216,065 B1 | * | 4/2001 | Hall et al. ....................... 701/16 |
| 6,259,975 B1 | * | 7/2001 | Rollet et al. ...................... 701/3 |
| 6,263,263 B1 | | 7/2001 | Shehi et al. |

(Continued)

*Primary Examiner* — Bhavesh V Amin
(74) *Attorney, Agent, or Firm* — Cantor Colburn LLP

(57) ABSTRACT

A method for velocity profile based approach to point control for an aircraft includes determining a distance from the aircraft to a target point; determining a velocity command based on the distance to the target point and a desired acceleration; and issuing the velocity command. A velocity profile based approach to point control module for an aircraft and a computer program product comprising a computer readable storage medium containing computer code that, when executed by a computer, implements a method for velocity profile based approach to point control are also provided.

17 Claims, 5 Drawing Sheets

(56) References Cited

U.S. PATENT DOCUMENTS

| | | | |
|---|---|---|---|
| 6,389,333 B1 * | 5/2002 | Hansman et al. | 701/3 |
| 6,438,469 B1 * | 8/2002 | Dwyer et al. | 701/16 |
| 6,527,225 B1 * | 3/2003 | Silder et al. | 244/76 R |
| 6,629,023 B1 * | 9/2003 | Silder et al. | 701/16 |
| 6,972,696 B2 * | 12/2005 | Rogers et al. | 340/971 |
| 7,248,208 B2 * | 7/2007 | Hager et al. | 342/120 |
| 7,248,967 B2 * | 7/2007 | Hagstedt | 701/507 |
| 7,365,652 B2 * | 4/2008 | Scherbarth | 340/974 |
| 7,499,773 B2 * | 3/2009 | Pire et al. | 701/3 |
| 7,693,620 B2 * | 4/2010 | Dubeck et al. | 701/16 |
| 2004/0215372 A1 * | 10/2004 | Bateman et al. | 701/1 |
| 2007/0021878 A1 * | 1/2007 | Builta et al. | 701/7 |
| 2007/0055418 A1 * | 3/2007 | Pire et al. | 701/14 |
| 2008/0252489 A1 * | 10/2008 | Naimer et al. | 340/971 |
| 2011/0137494 A1 * | 6/2011 | Litwinowicz | 701/3 |

\* cited by examiner

300

```
DETERMINE LONGITUDINAL DISTANCE FROM THE AIRCRAFT TO TARGET POINT
301
```

```
DETERMINE DESIRED LONGITUDINAL ACCELERATION
302
```

```
DETERMINE LONGITUDINAL VELOCITY COMMAND BY TAKING SQUARE ROOT OF
PRODUCT OF LONGITUDINAL DISTANCE AND DESIRED LONGITUDINAL ACCELERATION
303
```

```
ISSUE LONGITUDINAL VELOCITY COMMAND
304
```

400

DETERMINE LATERAL DISTANCE FROM THE AIRCRAFT TO TARGET POINT
401

DETERMINE DESIRED LATERAL ACCELERATION
402

DETERMINE LATERAL VELOCITY COMMAND BY TAKING SQUARE ROOT OF PRODUCT OF LATERAL DISTANCE AND DESIRED LATERAL ACCELERATION
403

ISSUE LATERAL VELOCITY COMMAND
404

SYSTEMS AND METHODS FOR VELOCITY PROFILE BASED APPROACH TO POINT CONTROL

CROSS-REFERENCE TO RELATED APPLICATION

This application claims the benefit of U.S. Provisional Application No. 61/267,120, filed Dec. 7, 2009.

FEDERAL RESEARCH STATEMENT

This invention was made with Government support under Government Contract #H92241-07-D-0003, awarded by the Army. The Government has certain rights in this invention.

BACKGROUND

This subject matter disclosed herein relates generally to the field of aircraft controls.

Automated aircraft controls are used to perform various aircraft functions, including approach to point control. Approach to point control automates an approach to a target point, i.e., flying of an aircraft to a hover (the velocity of the aircraft is zero) at the target point. Approach to point control may be implemented by determining an acceleration profile for the approach, based on the velocity of the aircraft and the distance from the aircraft to the target point, using the equation:

$$a_{command} = v^2/2d, \qquad \text{EQ. 1}$$

wherein $a_{command}$ is an acceleration command, v is the aircraft velocity, and d is the distance from the aircraft to the target point. The acceleration command $a_{command}$ gives the amount of deceleration needed to stop the aircraft at the target point based on v and d. However, determination of $a_{command}$ requires that the aircraft be in motion relative to the target point, and the approach must be started at a given distance to the target in order to limit the rate of deceleration to below a desired level.

BRIEF SUMMARY

According to one aspect of the invention, a method for velocity profile based approach to point control for an aircraft includes determining a distance from the aircraft to a target point; determining a velocity command based on the distance to the target point and a desired acceleration; and issuing the velocity command.

According to another aspect of the invention, a velocity profile based approach to point control module for an aircraft includes determining a distance from the aircraft to a target point; determining a velocity command based on the distance to the target point and a desired acceleration; and issuing the velocity command.

According to another aspect of the invention, a computer program product includes a computer readable storage medium containing computer code that, when executed by a computer, implements a method for a velocity profile based approach to point control, wherein the method includes determining a distance from the aircraft to a target point; determining a velocity command based on the distance to the target point and a desired acceleration; and issuing the velocity command.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for velocity profile based approach to point control are provided, with exemplary embodiments being discussed below in detail.

Approach to point control based on a velocity profile allows for an approach to point that is consistent and predictable in nature, and allows for the acceleration as well as the deceleration of the aircraft in order to meet the calculated velocity profile. The deceleration or acceleration of the aircraft in its approach to the target point is controlled to a desired acceleration $a_{desired}$ by the aircraft controls. The velocity profile is calculated using the equation:

$$v_{command} = \text{sqrt}(2d \cdot a_{desired}), \qquad \text{EQ. 2}$$

wherein $v_{command}$ is a velocity command, d is the distance from the aircraft to the target point, and $a_{desired}$ is the predetermined desired acceleration. The predetermined desired acceleration $a_{desired}$ may be determined, for example, by a pilot or may be a default value. The velocity command $v_{command}$ for the aircraft at a given distance from the target point is used to control the aircraft to ensure an approach to the target point with an acceleration equal to $a_{desired}$.

Figure 1:
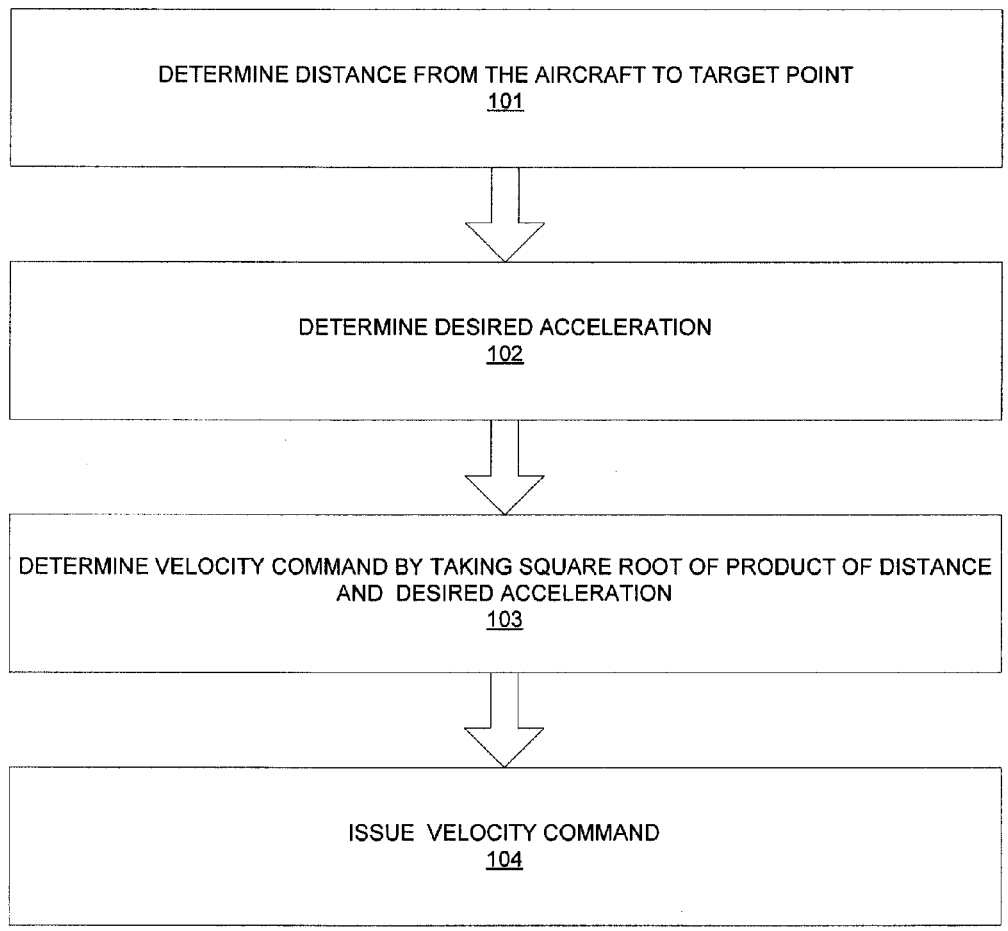
FIG. 1 illustrates an embodiment of a method for velocity profile based approach to point control.

FIG. 1 illustrates an embodiment of a method for velocity profile based approach to point control. The aircraft may initially be at any distance d from the target point, moving at any current appropriate velocity. The distance d from the aircraft to the target point is determined in block 101. In block 102, $a_{desired}$ is determined; $a_{desired}$ may be set by a pilot, or may be a default value. In block 103, $v_{command}$ is calculated based on $a_{desired}$ and d. The square root of the product of $a_{desired}$ and $2d$ may be calculated to determine $v_{command}$. In block 104, a velocity command based on $v_{command}$ is issued to the aircraft controls. The determined velocity command $v_{command}$ may be subject to a velocity limiter; i.e., if $v_{command}$ is greater than a predetermined velocity limit, a velocity command equal to the predetermined velocity limit is issued to the aircraft controls. The aircraft may be controlled to the velocity command by a groundspeed controller that uses the velocity command as a reference. Blocks 101-104 may be repeated, either continuously or at any appropriate interval, until the aircraft is at a hover at the target point (i.e., d=0).

Figure 2:
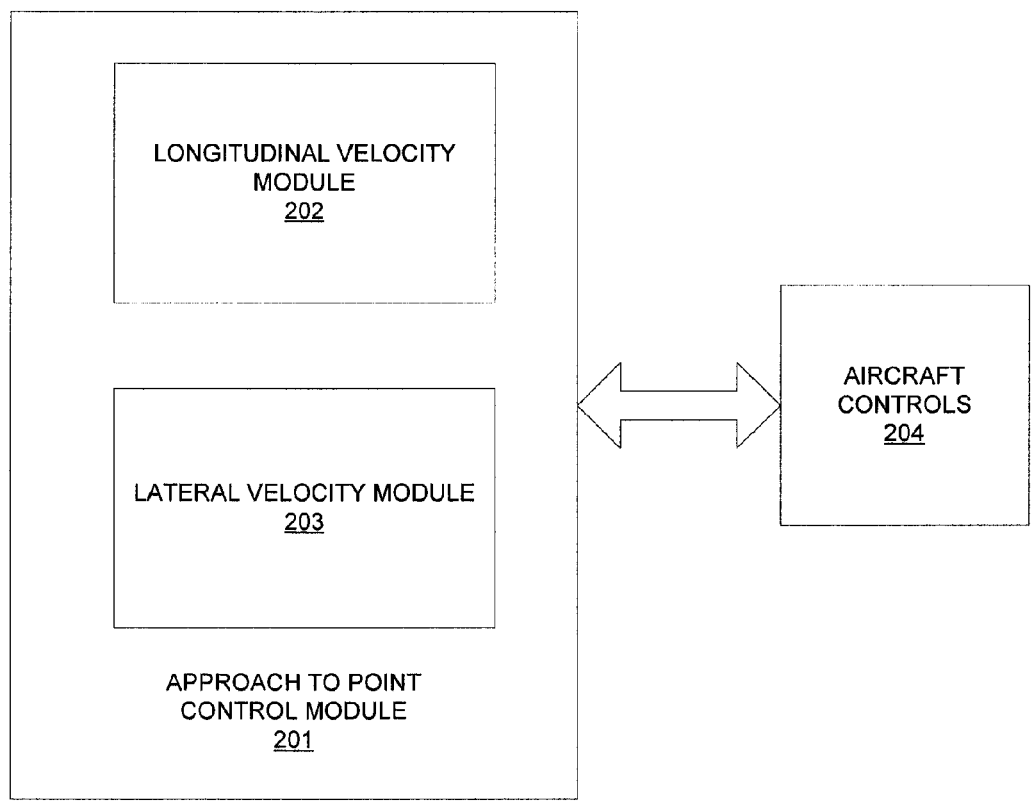
FIG. 2 illustrates an embodiment of a system for velocity profile based approach to point control.

FIG. 2 illustrates an embodiment of a system 200 for velocity profile based approach to point control. In the embodiment of FIG. 2, the approach to point control module 201 comprises a longitudinal velocity module 202, which is discussed below in more detail with regard to FIG. 3, and a lateral velocity module 203, which is discussed in more detail below with regard to FIG. 4. The target point is defined by a set of lateral and longitudinal coordinates. Longitudinal velocity commands and lateral velocity commands are separately calculated by longitudinal velocity module 202 and lateral velocity module 203, respectively. Approach to point control module 201 receives flight data from aircraft controls 204. The flight data includes the longitudinal distance and the lateral distance from the aircraft to the target point. Longitudinal velocity module 202 determines longitudinal velocity commands based on a longitudinal $a_{desired}$ and the longitudinal distance to the target point. Lateral velocity module 203 determines lateral velocity commands based on a lateral $a_{desired}$ and the lateral distance to the target point. Approach to point control module 201 provides the longitudinal and lateral velocity commands determined by longitudinal velocity module 202 and lateral velocity module 203, respectively, to the aircraft controls 204. The longitudinal and lateral velocity commands may be subject to a velocity limiter; for example, if a velocity command is greater than a predetermined velocity limit, a velocity command equal to the predetermined velocity limit is issued to aircraft controls 204. Aircraft controls 204 guide the aircraft to a hover at the target point based on the velocity commands received from approach to point control module 201. The aircraft controls 204 may include a groundspeed controller that uses velocity commands received from approach to point module 201 as a reference to control the velocity of the aircraft.

Figure 3:
FIG. 3 illustrates an embodiment of a method for determination of a longitudinal velocity command.
Figure 3:
Figure 3:

FIG. 3 illustrates an embodiment of a method 300 that may be implemented by a longitudinal velocity module 202. The longitudinal distance d from the aircraft to the target point is determined in block 301. In block 302, the longitudinal $a_{desired}$ is determined; the longitudinal $a_{desired}$ may be set by a pilot, for example, or may be a default value. In block 303, the longitudinal $v_{command}$ is calculated based on the longitudinal $a_{desired}$ and the longitudinal d. The square root of the product of the longitudinal $a_{desired}$ and twice the longitudinal d may be calculated to determine the longitudinal $v_{command}$. In block 304, a longitudinal velocity command based on the longitudinal $v_{command}$ is issued to the aircraft controls. The determined longitudinal velocity command $v_{command}$ may be subject to a longitudinal velocity limiter; i.e., if the longitudinal $v_{command}$ is greater than a predetermined longitudinal velocity limit, a longitudinal velocity command equal to the predetermined longitudinal velocity limit is issued to the aircraft controls. The aircraft may be controlled to the longitudinal velocity command by a groundspeed controller that uses the velocity command as a reference. Blocks 301-304 may be repeated, either continuously or at any appropriate interval, until the aircraft is at a hover at the target point (i.e., the longitudinal distance d=0).

Figure 4:
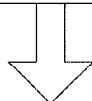
FIG. 4 illustrates an embodiment of a method for determination of a lateral velocity command.
Figure 4:
Figure 4:
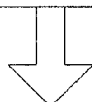

FIG. 4 illustrates an embodiment of a method 400 that may be implemented by a lateral velocity module 203. The lateral distance d from the aircraft to the target point is determined in block 401. In block 402, the lateral $a_{desired}$ is determined; the lateral $a_{desired}$ may be set by a pilot, for example, or may be a default value. In block 403, the lateral $v_{command}$ is calculated based on the lateral $a_{desired}$ and the lateral d. The square root of the product of the lateral $a_{desired}$ and twice the lateral d may be calculated to determine the lateral $v_{command}$. In block 404, a lateral velocity command based on the lateral $v_{command}$ is issued to the aircraft controls. The determined lateral velocity command $v_{command}$ may be subject to a lateral velocity limiter; i.e., if the lateral $v_{command}$ is greater than a predetermined lateral velocity limit, a lateral velocity command equal to the predetermined lateral velocity limit is issued to the aircraft controls. The aircraft may be controlled to the lateral velocity command by a groundspeed controller that uses the velocity command as a reference. Blocks 401-404 may be repeated, either continuously or at any appropriate interval, until the aircraft is at a hover at the target point (i.e., the lateral distance d=0).

Figure 5:
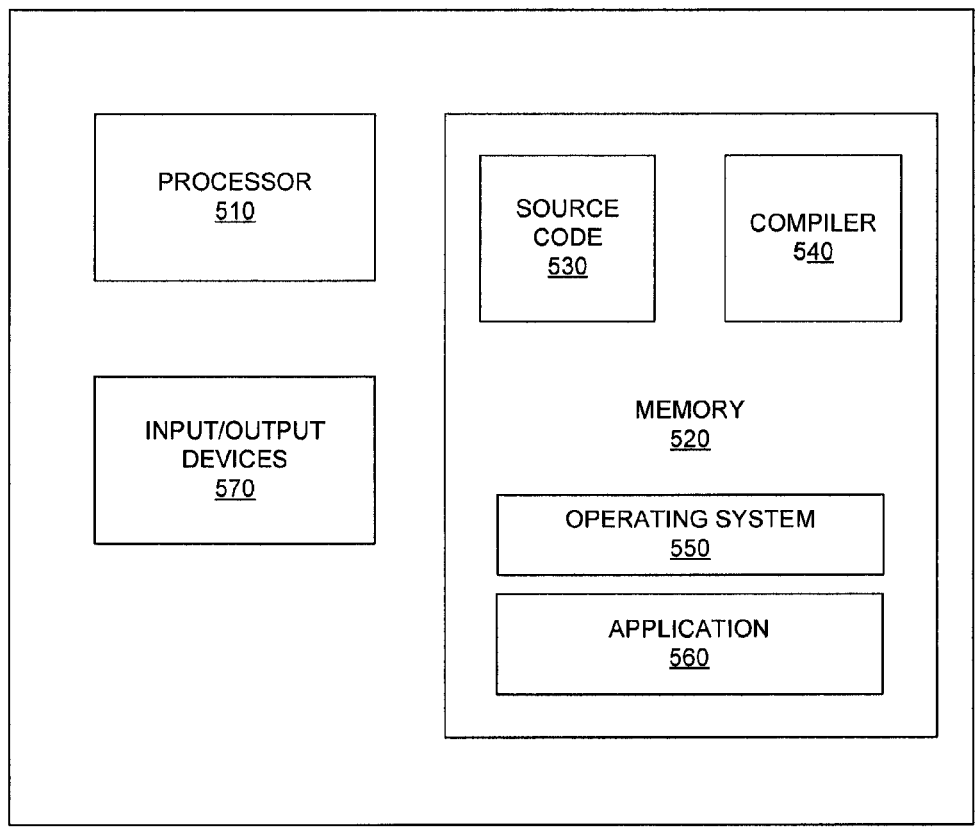
FIG. 5 illustrates an embodiment of a computer that may be used in conjunction with systems and methods for velocity profile based approach to point control.

FIG. 5 illustrates an example of a computer 500 which may be utilized by exemplary embodiments of systems and methods for velocity profile based approach to point control, as embodied in software. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, receivers, and the like, to enable communications. Further, the local interface may include address, control, and/or data connections to enable appropriate communications among the aforementioned components.

The processor 510 is a hardware device for executing software that can be stored in the memory 520. The processor 510 can be, for example, virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), or the like) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Memory 520 may also incorporate electronic, magnetic, optical, and/or other types of storage media. Memory 520 may also have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with the embodiments. As illustrated, the application 560 comprises numerous functional components for implementing the features and operations of the embodiments. The application 560 of the computer 500 may represent various applications, computational units, logic, functional units, processes, operations, virtual entities, and/or modules in accordance with the embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing the embodiments may be applicable on all commercially available operating systems.

Application 560 may be a source program, executable program (object code), script, or any other entity comprising a set of instructions to be performed. In the case of a source program, the program may be translated via a compiler (such as compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera or the like. The I/O devices 570 may also include output devices, for example but not limited to a printer, display or the like. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, or the like. The I/O devices 570 may also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in a type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, which may be buffered within the processor 510, and then executed.

When the application 560 is implemented in software, the application 560 may be stored on any computer readable medium for use by or in connection with any computer related system or method. A computer readable medium may be an electronic, magnetic, optical, or other physical device or means that can contain or store a computer program for use by or in connection with a computer related system or method.

The application 560 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. A computer-readable medium may be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical), or the like. The computer-readable medium may be paper or another suitable medium, upon which the program is printed or punched, as the program can be electronically captured, via, for example, optical scanning of the paper or other medium, then compiled, interpreted or otherwise processed in a suitable manner if necessary, and then stored in a computer memory.

In exemplary embodiments, where the application 560 is implemented in hardware, the application 560 may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), and the like.

The technical effects and benefits of exemplary embodiments include an approach to point control that provides a predictable, controllable approach at a predetermined acceleration rate. The terminology used herein is for the purpose of describing particular embodiments and is not intended to be limiting of the invention.

While description of the present invention has been presented for purposes of illustration and description, it is not intended to be exhaustive or limited to the invention in the form disclosed. Many modifications, variations, alterations, substitutions, or equivalent arrangements not heretofore described will be apparent to those of ordinary skill in the art without departing from the scope and spirit of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A computer-implemented method for velocity profile based approach to point control for an aircraft, the method comprising:
    determining, by a processor of a computer, a distance from the aircraft to a target point;
    determining a velocity command based on the distance to the target point and a desired acceleration, wherein the velocity command is determined based on a square root of a product of two times the distance to the target point and the desired acceleration; and
    issuing the velocity command.

2. The method of claim 1, further comprising repeating determining the distance to the target point, determining the velocity command, and issuing the velocity command until the aircraft is at a hover at the target point.

3. The method of claim 1, wherein the issued velocity command is used as a reference by a groundspeed controller to control a velocity of the aircraft.

4. The method of claim 1, wherein the desired acceleration is configured by a pilot, or is a default value.

5. The method of claim 1, wherein the distance from the aircraft to the target point is a longitudinal distance, the desired acceleration is a desired longitudinal acceleration, and the velocity command is a longitudinal velocity command.

6. The method of claim 1, wherein the distance from the aircraft to the target point is a lateral distance, the desired acceleration is a desired lateral acceleration, and the velocity command is a lateral velocity command.

7. The method of claim 1, wherein the velocity command is limited by a predetermined velocity limit.

8. A velocity profile based approach to point control computer module for an aircraft, which comprises:
    a processor configured to:
        determine a distance from the aircraft to a target point;
        determine a velocity command based on the distance to the target point and a desired acceleration, wherein the velocity command is determined based on a square root of a product of two times the distance to the target point and the desired acceleration; and
        issue the velocity command.

9. The approach to point control module of claim 8, further comprising repeating determining the distance to the target point, determining the velocity command, and issuing the velocity command until the aircraft is at a hover at the target point.

10. The approach to point control module of claim 8, further comprising a groundspeed controller configured to use the issued velocity command as a reference control a velocity of the aircraft.

11. The approach to point control module of claim 8, wherein the desired acceleration is configured by a pilot, or is a default value.

12. The approach to point control module of claim 8, wherein the target point is defined by a set of longitudinal and lateral coordinates, and the approach to point control module comprises a longitudinal velocity module and a lateral velocity module.

13. The approach to point control module of claim 12, wherein the longitudinal velocity module determines a longitudinal distance from the aircraft to the target point, a longitudinal desired acceleration, and a longitudinal velocity command, and the longitudinal velocity module issues a longitudinal velocity command.

14. The approach to point control module of claim 12, wherein the lateral velocity module determines a lateral distance from the aircraft to the target point, a lateral desired acceleration, and a lateral velocity command, and the lateral velocity module issues a lateral velocity command.

15. The approach to point control module of claim 8, further comprising a velocity limiter configured to limit the velocity command to a predetermined velocity limit.

16. A computer program product comprising a computer readable storage medium containing computer code that, when executed by a computer, implements a method for velocity profile based approach to point control, wherein the method comprises:
    determining a distance from the aircraft to a target point;
    determining a velocity command based on the distance to the target point and a desired acceleration, wherein the velocity command is determined based on a square root of a product of two times the distance to the target point and the desired acceleration; and
    issuing the velocity command.

17. The approach to point control module of claim 16, further comprising repeating determining the distance to the target point, determining the velocity command, and issuing the velocity command until the aircraft is at a hover at the target point.

* * * * *